US005410290A

United States Patent [19]

Cho

[11] Patent Number: 5,410,290

[45] Date of Patent: Apr. 25, 1995

[54] SHAPE MEMORY ALLOY RELAYS AND SWITCHES

[76] Inventor: Dong-Il Cho, Dept. of Control & Instrumentation Engineering Seoul National University, Kwanaku-ku, Shinlim-dong San 56-1 Seoul 151-742, Rep. of Korea

[21] Appl. No.: 101,249

[22] Filed: Aug. 2, 1993

[51] Int. Cl.[6] .............................................. H01M 61/06

[52] U.S. Cl. ........................................ 337/140; 60/527

[58] Field of Search ............................ 337/140; 60/527

[56] References Cited

U.S. PATENT DOCUMENTS

| | | | |
|---|---|---|---|
| 3,403,238 | 9/1968 | Buehler et al. | 337/140 |
| 3,652,969 | 3/1972 | Willson et al. | 337/140 |
| 3,731,247 | 5/1973 | Levinn | 337/140 |
| 4,679,023 | 7/1987 | Nelson . | |
| 4,684,913 | 8/1987 | Yaeger . | |
| 4,700,541 | 10/1987 | Gabriel et al. . | |
| 4,864,824 | 9/1989 | Gabriel et al. . | |
| 4,965,545 | 10/1990 | Johnson . | |
| 5,061,914 | 10/1991 | Busch et al. . | |
| 5,107,898 | 5/1991 | Kuzukawa . | |
| 5,127,228 | 7/1992 | Swenson . | |
| 5,206,775 | 4/1993 | Wilson . | |

OTHER PUBLICATIONS

Gabriel, K. J. et al., "A Micro Rotary Actuator Using Shape Memory ALloys," *Sensors and Actuators* 15:95–102 (1988).

*Primary Examiner*—Lincoln Donovan

*Attorney, Agent, or Firm*—Lynn Fiorito Watts

[57] ABSTRACT

The present invention provides several embodiments of an electrical switch that uses a shape memory alloy (SMA). In one embodiment the electrical switch is an on-off switch and comprises a first support member with a first electrical contact mounted thereon, a second support member with a second electrical contact mounted thereon, and a third support member disposed between the first and second support members. A wire element made from a shape memory alloy (SMA) is attached at either end to the third support member. A switch element made of an electrically-conducting material is attached to the SMA wire element at a position intermediate the ends of the wire element. Heating means are provided for selectively heating sections of the SMA wire element in order to make the SMA wire element turn or rotate, thereby causing the switch element to pivot into contact with either the first electrical contact or the second electrical contact.

30 Claims, 10 Drawing Sheets

SHAPE MEMORY ALLOY RELAYS AND SWITCHES

BACKGROUND OF THE INVENTION

The present invention relates to electrical switches and relays, and in particular, switches and relays that use an elongated shape memory alloy (SMA) element.

Shape memory alloys (SMA's) are well known alloys that are capable of undergoing plastic deformation from a "trained" shape to a "memory" shaped when heated. If the SMA material is then allowed to cool, it will deform back to its "trained" shape. The SMA material undergoes a reversible transformation from an austenitic state to a martensitic state with a change in temperature. If the SMA material is deformed to a "trained" shape while below the martensitic temperature and then heated above the austenitic temperature, the SMA material will return to its shape existing before the deformation, i.e. to its "memory" shape.

Various actuators have been proposed that use SMA's. See for example U.S. Pat. No. 4,700,541 to Kaigham J. Gabriel et al. wherein a rotary actuator is described that uses a wire made of an SMA material that is twisted or torsioned about its longitudinal axis. The ends of the wire are then constrained against movement, and a control member such as a fluid tube is bonded to the wire at a desired point. A plurality of electrical connections to the wire define different longitudinal sections of the wire to which voltages may be applied in order to heat the sections. By selectively heating and cooling the sections of the wire, the sections can work in opposition to one another in order to controllably rotate the wire and the control member.

Heretofore, SMA's have not typically been used in switches or relays. Conventional switches and relays normally are actuated by solenoid coils. These solenoid-type switches, however, can have a relatively limited reliability and can be relatively expensive to mass produce due to the assembly requirements for the solenoid.

SUMMARY OF THE INVENTION

The present invention provides several embodiments of an electrical switch that uses a shape memory alloy (SMA). In one embodiment the electrical switch is an on-off switch and comprises a first support member with a first electrical contact mounted thereon and a second support member with a second electrical contact mounted thereon. A third support member is disposed between the first and second support members. A wire element made from a shape memory alloy (SMA) is attached at either end to the third support member.

A switch element made of an electrically-conducting material is attached to the SMA wire element at a position intermediate the ends of the wire element. Heating means are provided for selectively heating sections of the SMA wire element. The heating causes the SMA wire element to turn or rotate, which in turn causes the switch element to pivot into contact with either the first electrical contact or the second electrical contact. In one embodiment of the invention, the heating of the SMA wire element is accomplished by laser or optical heating. In another embodiment the SMA wire element is heated by selectively applying an electrical current to the wire element. In still another embodiment of the invention, a high-resistivity wire is twisted with the SMA wire element, and an electrical current is selectively applied to the high-resistivity wire.

The present invention also provides an embodiment of another on-off switch and of a relay switch.

BRIEF DESCRIPTION OF THE DRAWINGS

Further objects and advantages of the disclosed invention will become apparent from a reading of the following description when read in conjunction with the accompanying drawings, in which.

DETAILED DESCRIPTION OF THE PREFERRED EMBODIMENTS

Figure 1:
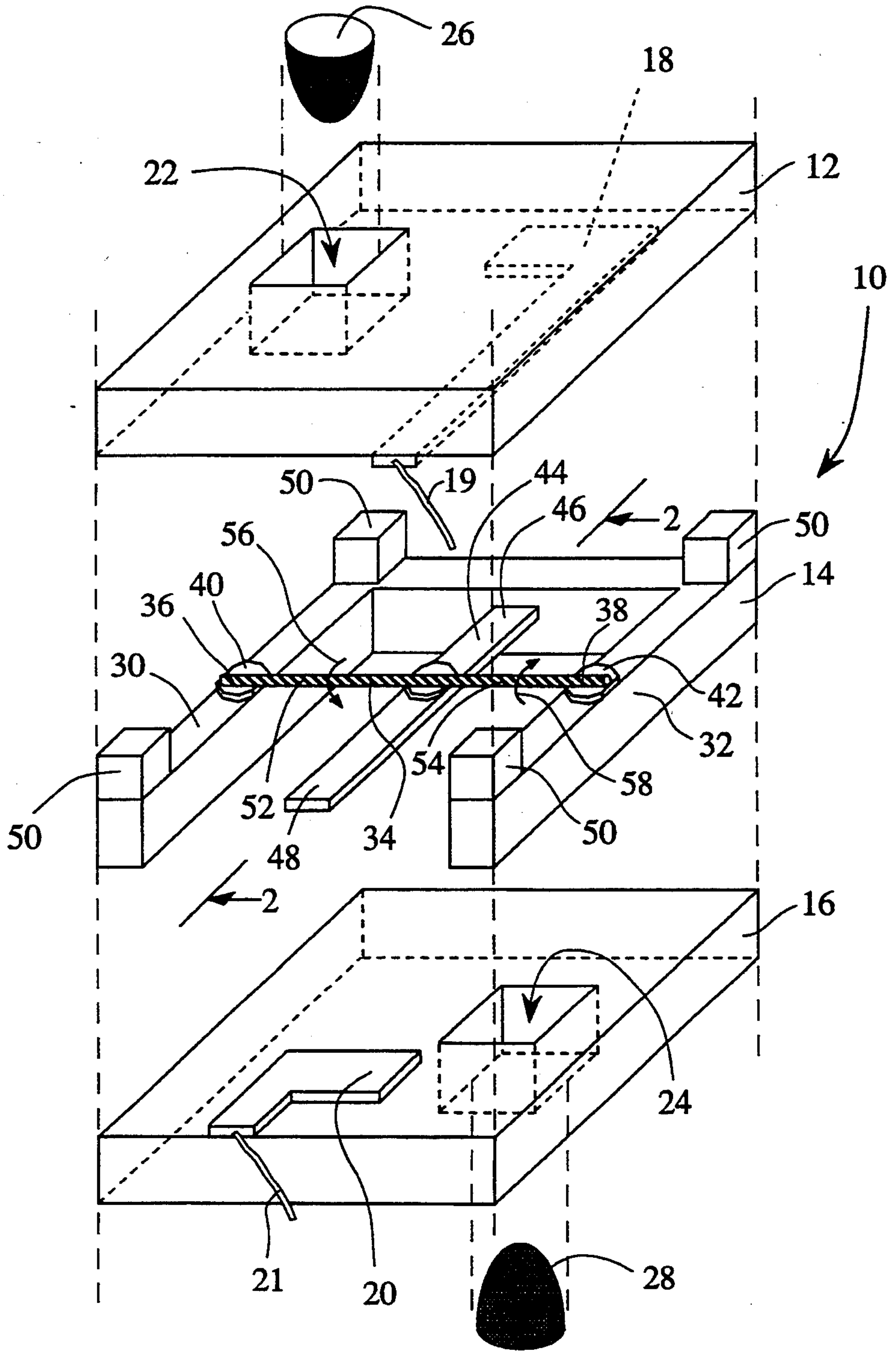
FIG. 1 is an exploded perspective view of a first embodiment of an on-off switch in accordance with the present invention.
Figure 2:
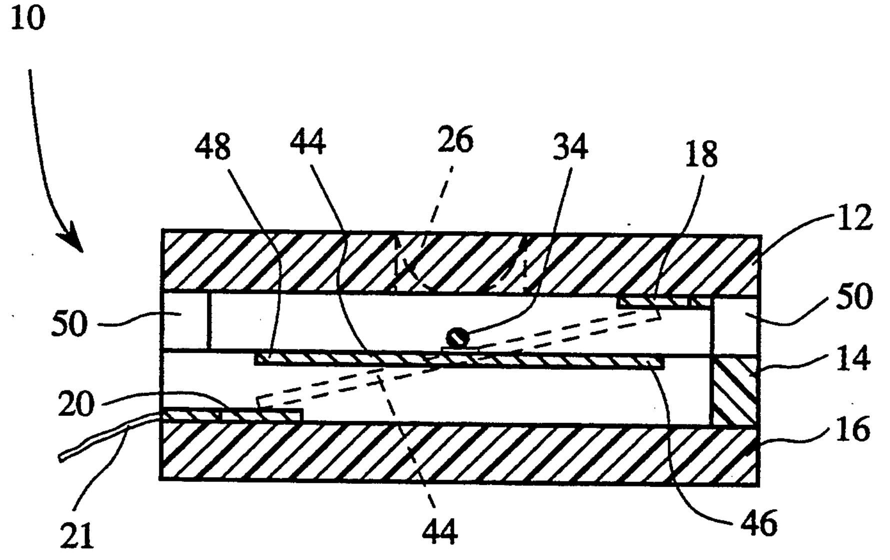
FIG. 2 is a cross-sectional view of the on-off switch taken along line 2—2 of FIG. 1.

With reference to the drawings, wherein like reference characters represent like components throughout the various views, and with particular reference to FIG. 1 and FIG. 2, an on-off switch 10 is depicted that can be activated to close or open an electrical circuit. The on-off switch comprises a top plate 12, middle plate 14, and bottom plate 16. The terms "top" and "bottom" are used throughout the specification solely for purposes of convenience in describing the invention. The use of these terms is not intended in any way to limit the invention to any particular position.

The top and bottom plates 14 and 16 are substantially flat plates preferably made from an electrically-insulating material such as plastic, fiberglass, epoxy resin, ceramic or other suitable material. The top plate 14 is provided with an input contact 18 that is electrically connected to a conductor 19. The bottom plate 16 is provided with an output contact 20 that is electrically connected to a conductor 21. The contacts 18 and 20 may be made of conventional electrically-conducting material such as copper or phosphor bronze. Both the top and bottom plates 12 and 16 are also provided with recesses 22 and 24 for receiving respective light-emitting diodes (LED's) 26 and 28.

The middle plate 14 has generally a "U" shape with side legs 30 and 32 and is preferably made from a suitable, electrically-insulating material. A thin wire 34 formed from a shape memory alloy (SMA) extends from one leg 30 to the other leg 32. The SMA wire 34 is twisted about its longitudinal axis before being attached to the legs 30 and 32 of the middle plate 14. As explained in further detail below, this twisting deforms the SMA wire 34 into an initial "trained" shape.

The SMA may be one of a variety of conventional SMA's, such as Nickel Titanium, that are well known in the art and commercially available in the form of wires from TiNi Alloy Company of Oakland, Calif. The ends 36 and 38 of the SMA wire 34 are preferably welded to the legs 30 and 32, as indicated by welds 40 and 42, respectively. The welding provides a more secure hold on the wire 34. The welds 40 and 42 may be either solder, epoxy or the like.

Welded to the wire 34 between the ends 36 and 38 is a relay tongue 44. The tongue 44 may be made from one of a variety of electrically-conducting materials such as copper, phosphor-bronze, gold, silver, or tungsten. As explained in more detail further below, the relay tongue 44 can be selectively pivoted to turn the switch 10 "on" and "off". With reference to FIG. 2, the tongue 44 is shown in an "off" position wherein the ends 46 and 48 of the relay tongue are not in contact with the contacts 18 and 20. The tongue 44 may be pivoted into an "on" position wherein, as shown in phantom, the ends 46 and 48 of the relay tongue 44 contact the input contact 18 and the output contact 20, respectively. The tongue 44 thereby closes the electrical circuit between the two conductors 19 and 21.

By way of example, the tongue 44 is shown welded to the wire 34 at the tongue's approximate midpoint so that the ends 46 and 48 will reach the respective contacts 18 and 20 when the tongue 44 is pivoted into an "on" position. The tongue 44, however, can be welded at a different point depending upon the positioning of the contacts 18 and 20 on the plates 12 and 16. The tongue 44 is also shown welded to the approximate midpoint of the wire 34. The tongue 44, however, may be welded to a different point along the wire 34, if desired; however a position proximate the middle of the wire 34 is preferred.

When fully assembled, the middle plate 14 is sandwiched between the top and bottom plates 14 and 16, with the bottom plate 16 being directly bonded to the middle plate 14. In order to provide ample space for movement of the tongue 44, the top plate 12 is preferably spaced from the middle plate 14 by spacers 50 which are bonded to both the top and middle plates. The spacers 50 are preferably made from a suitable, electrically-insulating material.

The operation of the on-off switch 10 will now be explained. As described above, the SMA wire 34 is twisted about its longitudinal axis into a "trained" shape prior to the ends 36 and 38 being welded to the middle plate 14. Consequently, if heat is subsequently applied to the wire 34, the wire 34 will turn about its longitudinal axis in an attempt to return to its non-twisted, "memory" shape. The switch 10 uses this turning motion of the wire to control the operation of the switch 10.

The switch 10 may be switched "on" by activating the LED 26 in order to optically heat one side 52 of the SMA wire 34, thereby causing the one side 52 to turn about its longitudinal axis in an attempt to return to its non-twisted, "memory" shape. The ends 36 and 38 of the SMA wire 34 being fixed to the legs 30 and 32 of the middle plate 14 will not turn. Rather, the side 52 of the wire that is heated will start to untwist, turning in a first direction, as indicated by arrow 56. The other side 54 will also turn in the first direction 56, but will become further twisted due to the ends 36 and 38 being fixed. As the wire turns, the tongue 44 will also turn or pivot in the first direction 56 and, if sufficient heat is applied, will come into contact with the contacts 18 and 20. This contact closes the electrical path between the two conductors 19 and 21.

Once the contact between the tongue 44 and the contacts 18 and 20 has been established, the LED 26 may be deactivated and heat no longer applied to the side 52 of the wire 34. The wire 34 will maintain its new rotated shape with the tongue 44 remaining in contact with the contacts 18 and 20. As the wire 34 cools, the one side 52, having been slightly untwisted due to the heating, would be inclined to return to its "trained" shape which had more twist. However, the other side 54 will have established a new "trained" shape that will hold the wire substantially in the new rotated position.

The switch 10 may be switched "off" so that the electrical path between the two conductors 19 and 21 is open, by activating the other LED 28. The LED 28 optically heats the other side 54 of the SMA wire 34 causing it to turn in an opposite direction, as indicated by arrow 58, in an attempt to unwind and return to its non-twisted, "memory" shape. The tongue 44 will also be motivated to pivot in this opposite direction 58, away from contact with the contacts 18 and 20. Once the tongue 44 has moved away from contact with the contacts 18 and 20, the LED 28 can be deactivated and the wire 34 allowed to cool. The wire 34 will tend to remain in its new shape with the tongue 44 no longer in contact with the contacts 18 and 20. Switching the switch 10 back "on" can be achieved by again activating the LED 26.

The present invention provides a fast-acting switch that can easily be manufactured at a relatively low cost. The switch may be made in a variety of sizes ranging from a micro size to a more large size. By way of example, the micro-sized switch may be approximately 1 millimeter (mm) by 1 mm by ½ mm and use a 100 micron gauge SMA wire. A medium-sized switch might be approximately 5 mm by 5 mm by 4 mm and use a 250 micron gauge SMA wire, and a large-sized switch might be approximately 10 cm by 10 cm by 5 cm and use a 5 mm gauge SMA wire.

The amount of twist needed to initially be placed on the SMA wire 34 prior to being affixed to the middle plate 14 is minimal. One-half turn would be sufficient for the micro-sized switch. The on-half turn would provide a safety factor of at least five since only approximately one-tenth of a turn would be required to pivot the tongue 44 into contact with the contacts 18 and 20. This safety factor ensures that the tongue 44 will remain in contact with the contacts 18 and 20 after the heat source has been removed should the tongue move back slightly after the SMA wire 34 has cooled. Additional twisting may be desired depending on, for example, the size of the switch.

The amount of heat that needs to be applied to the SMA wire is also minimal. Temperatures reaching that of hot water from a typical faucet are sufficient to heat the wire so that it will turn enough to move the tongue 44 into contact with the contacts 18 and 20. Such temperatures may be in the range of 80 to 90 degrees Celsius. For smaller switches, a typical off-the-shelf LED can provide the necessary heat at close distances. Other light sources, however, could also be used. Diode lasers would work very well. The response of the SMA wire to the applied heat is very quick thus making the switch very fast-acting.

Figure 3:
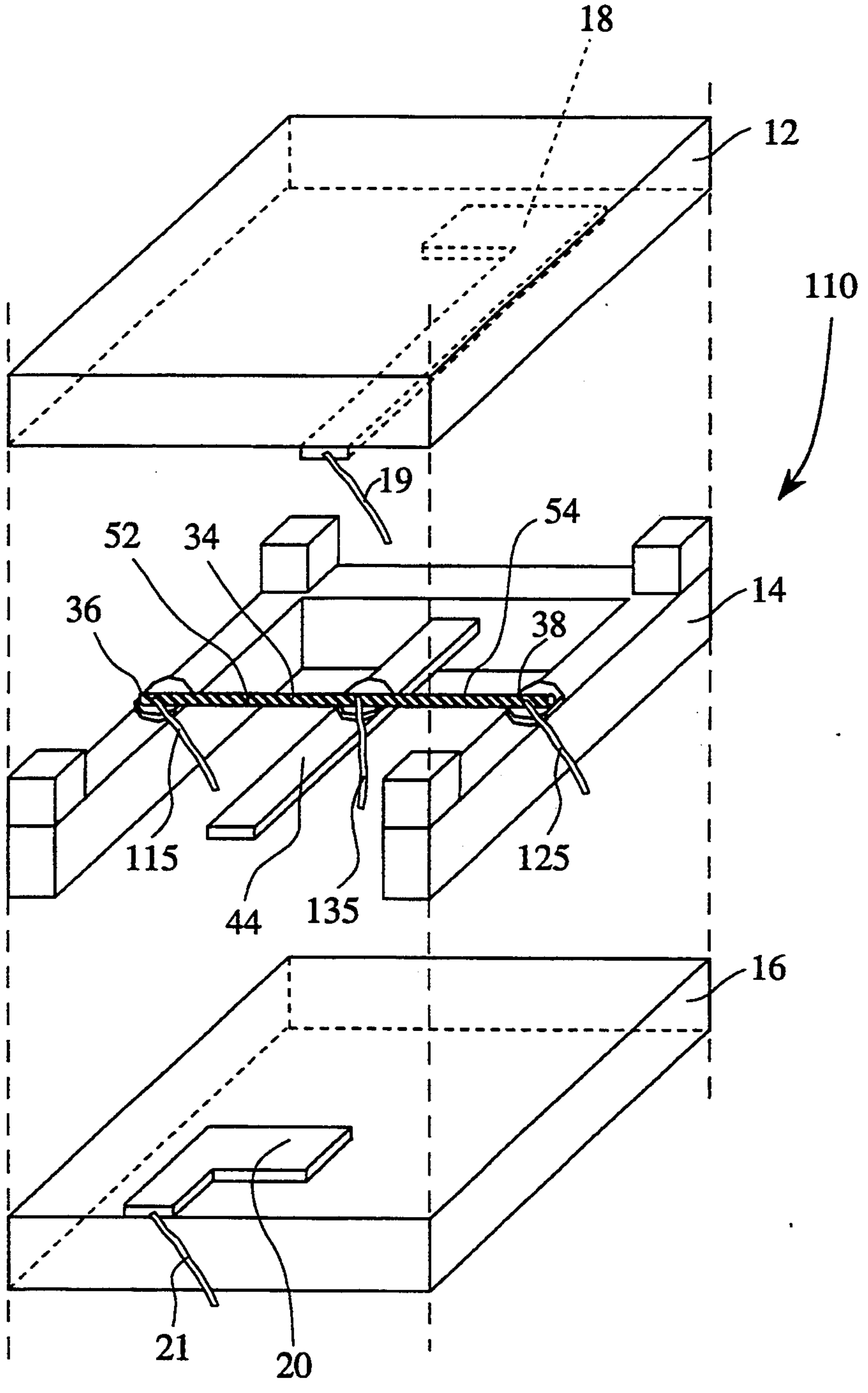
FIG. 3 is an exploded perspective view of a second embodiment of an on-off switch in accordance with the present invention.

FIG. 3 illustrates a second embodiment of the invention. An on-off switch 110 is shown that is similar to the switch 10 of FIG. 1 except that the heating of the wire 34 is accomplished by applying current to the wire rather than using an LED or other light source. The switch 110 is provided with three electrical connections 115, 125, and 135 that are attached, respectively, to either end 36 and 38 of the wire 34 and to the middle of the wire 34 at the tongue 44.

The switch 110 may be switched "on" by applying current to the electrical connections 115 and 135 in order to heat the one side 52 of the wire 34. The tongue 44 will consequently pivot into contact with the contacts 18 and 20. The switch 110 may then be turned "off" by applying current to the electrical connections 125 and 135 in order to heat the other side 54 and pivot the tongue in the opposite direction.

Although the switch will operate with the wire 34 being electrically heated as described above with reference to FIG. 3, such heating is not very efficient because the typical SMA does not have a high electrical resistivity. Accordingly, using an optical heating means such as an LED may be preferable. Alternatively, as described further below with reference to FIGS. 8–10, a high-resistivity wire may be twisted with the SMA wire and the electrical current applied to it instead of the SMA wire.

Figure 4:
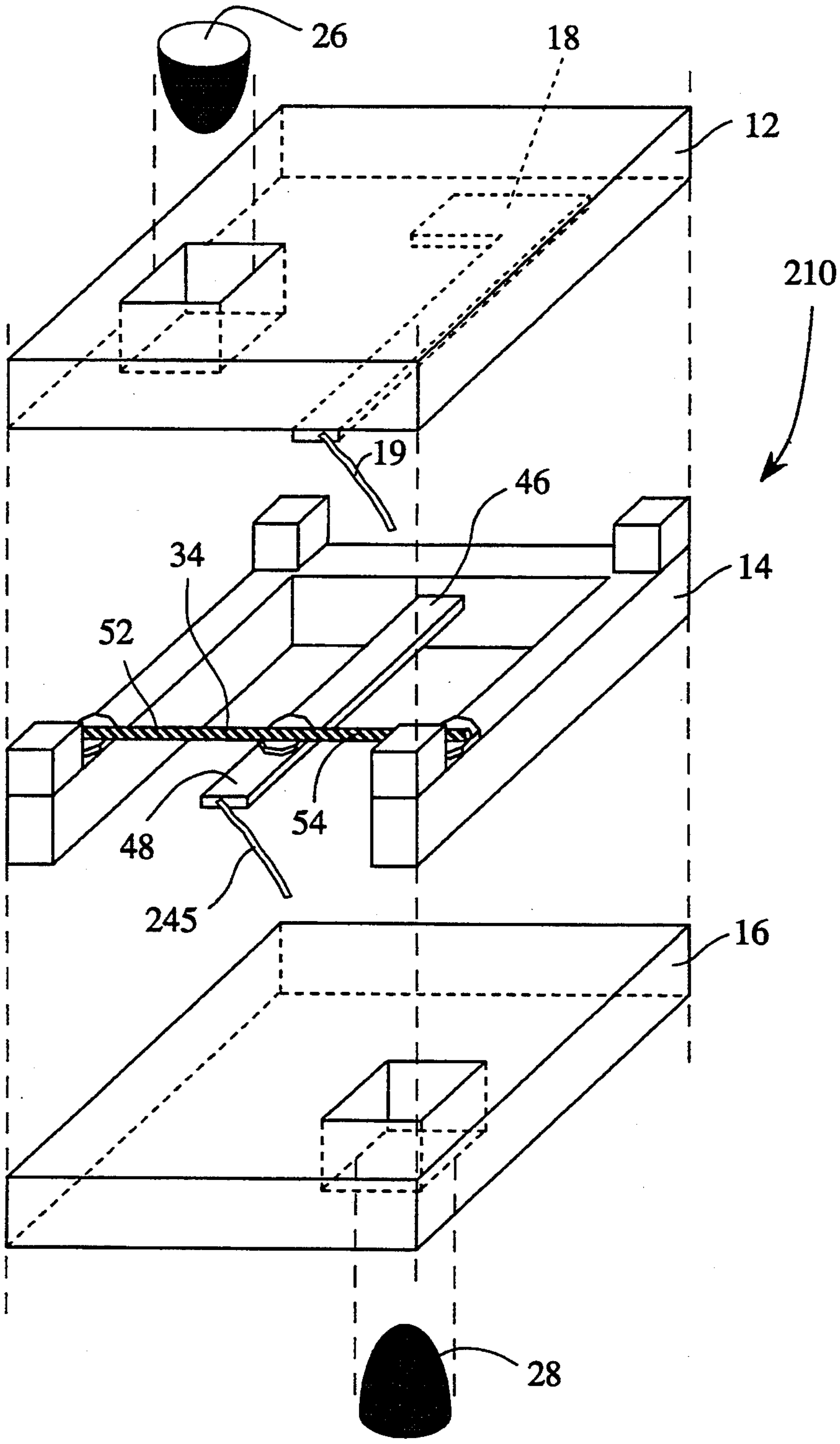
FIG. 4 is an exploded perspective view of a third embodiment of an on-off switch in accordance with the present invention.

FIG. 4 illustrates a third embodiment of the invention. An on-off switch 210 is shown that is similar to the switch 10 of FIG. 1 except that the bottom plate 16 is not provided with a contact or an electrical conductor. Rather, the tongue 44 is provided with an electrical conductor 245. The switch 210 is activated to open and close the electrical path between the conductor 245 and the conductor 19 of the contact 18 by bringing the end 46 of the tongue 44 into and out of contact with the contact 18.

The switching is accomplished in a manner similar to that described with reference to FIG. 1. To close the electrical path, the end 46 of the tongue 44 is pivoted into contact with the contact 18 by activating the LED 26. The path may be opened by activating the other LED 28 to motivate the tongue 44 away from contact with the contact 18. As shown, the wire 34 is welded to the tongue 34 at a point closer to one end 48 of the tongue 44 to allow proper pivoting of the tongue.

Figure 5:
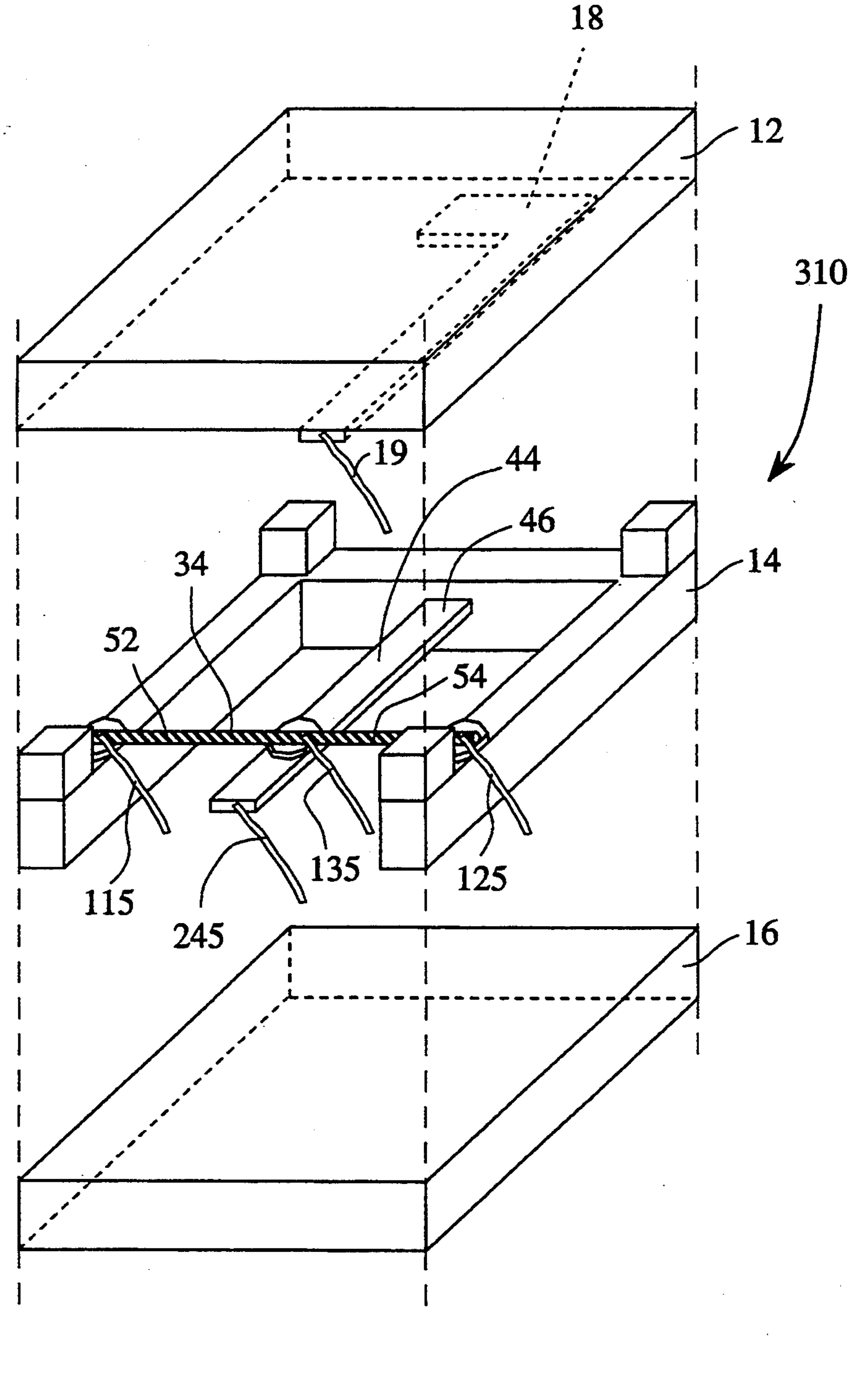
FIG. 5 is an exploded perspective view of a fourth embodiment of an on-off switch in accordance with the present invention.

FIG. 5 illustrates a fourth embodiment of the invention. An on-off switch 310 is shown that is similar to that of FIG. 4 except that the heat is applied electrically. Hooked to the SMA wire 34 are electrical connections 115, 125, and 135 to which electrical current may be selectively applied in a manner similar to that of the switch 110 of FIG. 3 in order to selectively heat the sections 52 and 54 of the wire 34. The heating causes the end 46 of the tongue 44 to pivot into and out of contact with the contact 18.

Figure 6:
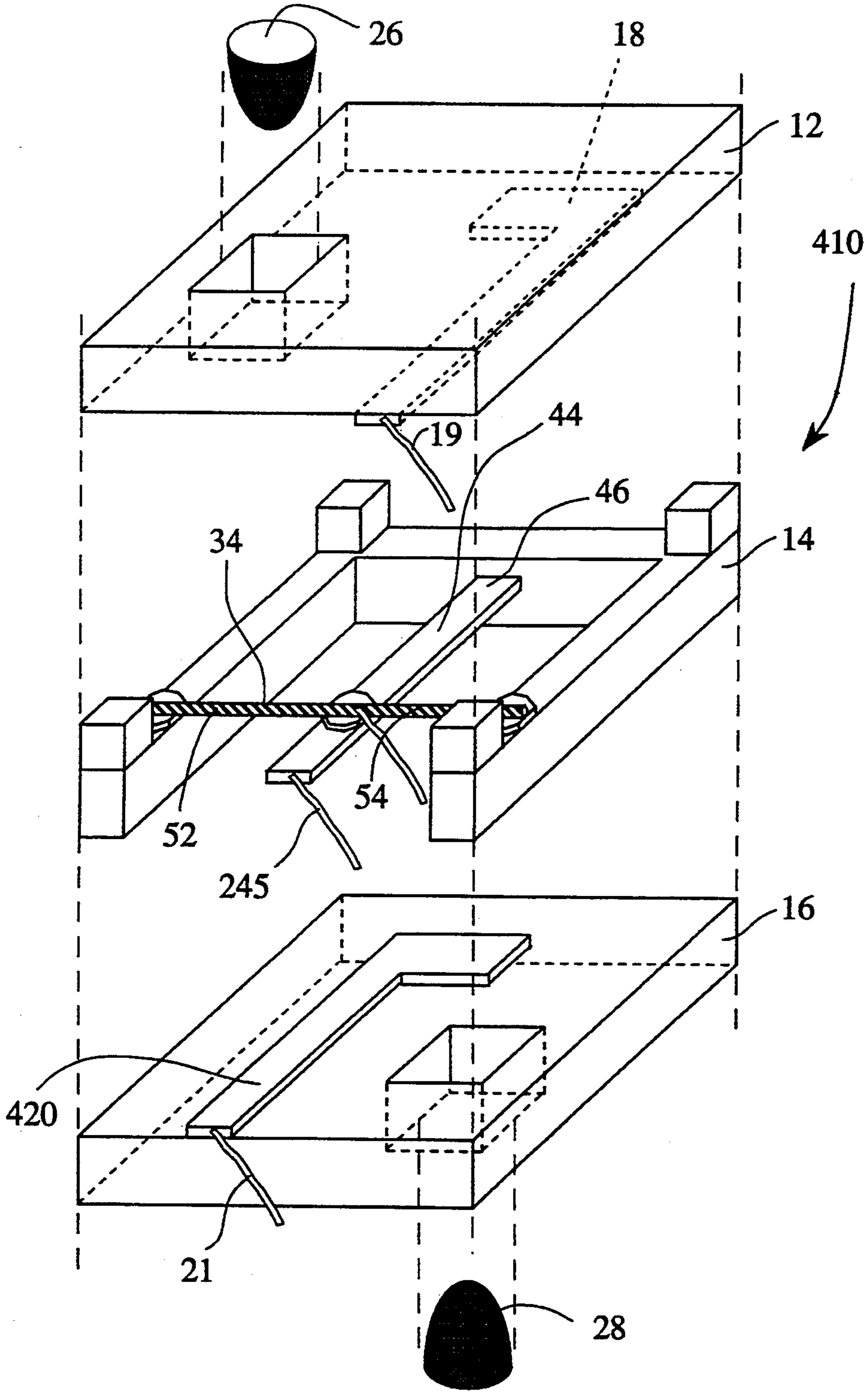
FIG. 6 is an exploded perspective view of a first embodiment of a two-way relay switch in accordance with the present invention.

FIG. 6 illustrates a fifth embodiment of the invention. A relay 410 is shown that is similar in construction to the switch 10 of FIG. 1. The bottom plate 16 of the relay 410, however, is provided with a different shaped contact 420. In addition, the wire 34 is welded closer to one end 48 of the tongue 44, and the tongue 44 is provided with an electrical conductor 245. The end 46 of the tongue 44 may be selectively pivoted into contact with the top plate contact 18 or the bottom plate contact 420 by activating either the LED 26 or LED 28, respectively.

When the tongue end 46 contacts the top plate contact 18, the electrical path between the conductor 19 and the conductor 245 is closed. When the tongue end 46 contacts the bottom plate contact 420, the electrical path between the conductor 21 and the conductor 245 is closed. The tongue 44 can be moved to an "open" position, as shown, where the tongue does not contact either of the contacts 18 and 420, by minutely pulsing either of the LED's 26 and 28 on and off depending upon which direction the tongue is to be moved. The pulsing will cause the wire to be only slightly heated so that the wire 34 to turn only slightly. Preferably, the pulsing continues until the electrical contact between the tongue and the respective contact 18 or 420 is opened.

Figure 7:
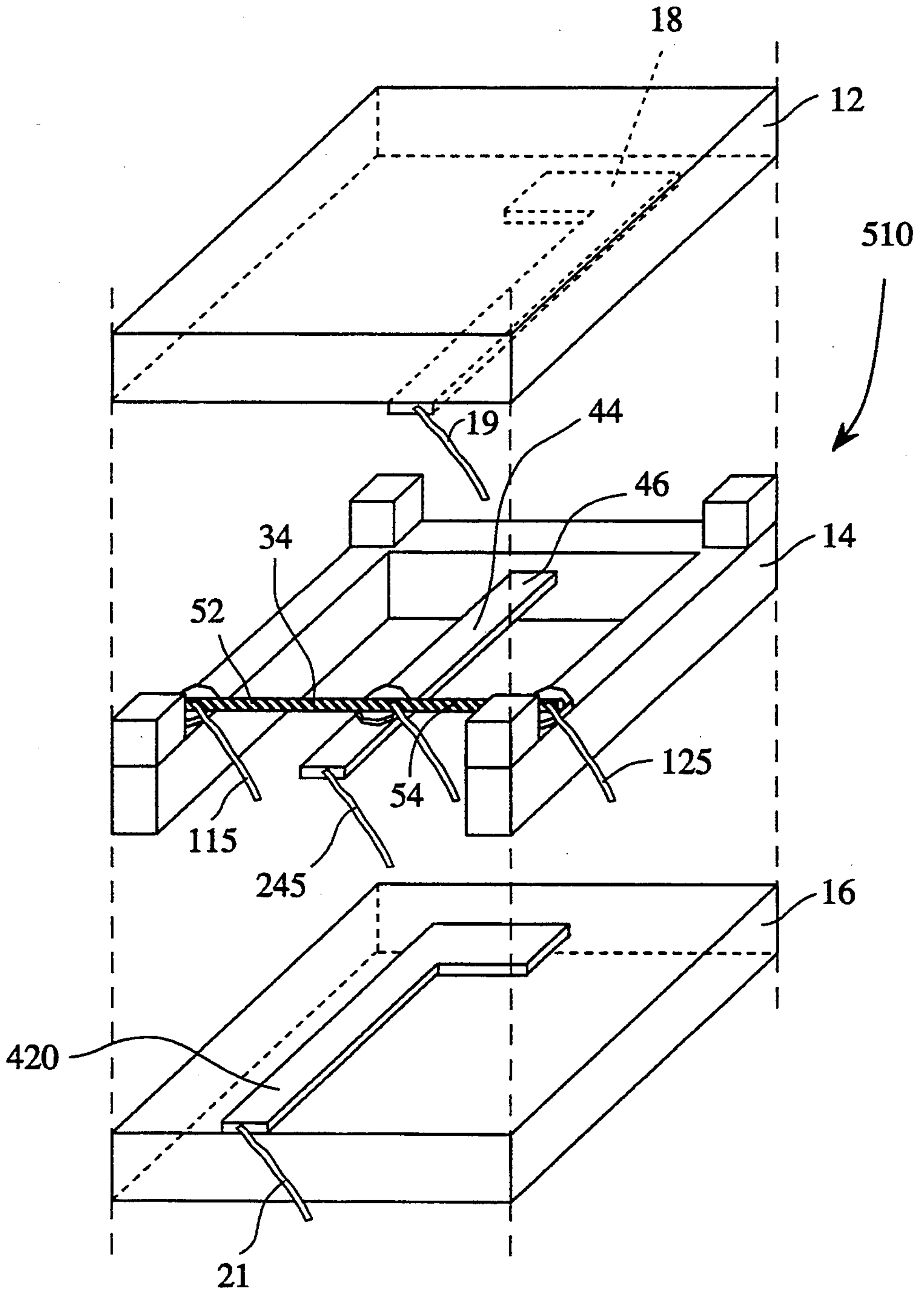
FIG. 7 is an exploded perspective view of a second embodiment of a two-way relay switch in accordance with the present invention.

FIG. 7 illustrates a sixth embodiment of the invention. A relay 510 is illustrated that is similar to the switch 410 of FIG. 6 except that the heating of the wire 34 is achieved electrically instead of optically. The wire 34 is provided with electrical connections 115, 125, and 135 that can selectively apply current to the sections 52 and 54 of the wire 34.

Figure 8:
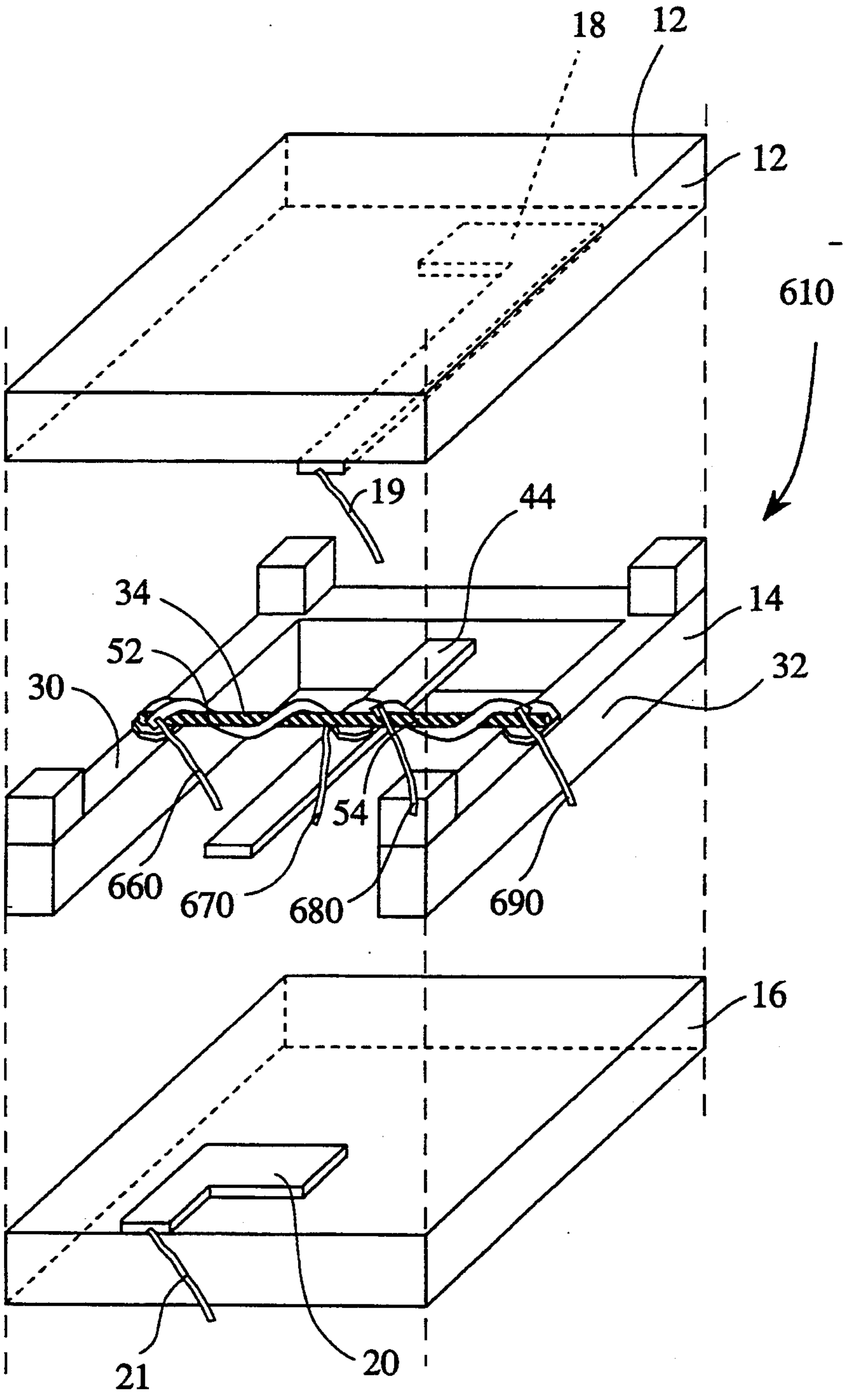
FIG. 8 is an exploded perspective view of a fifth embodiment of an on-off switch in accordance with the present invention.
Figure 9:
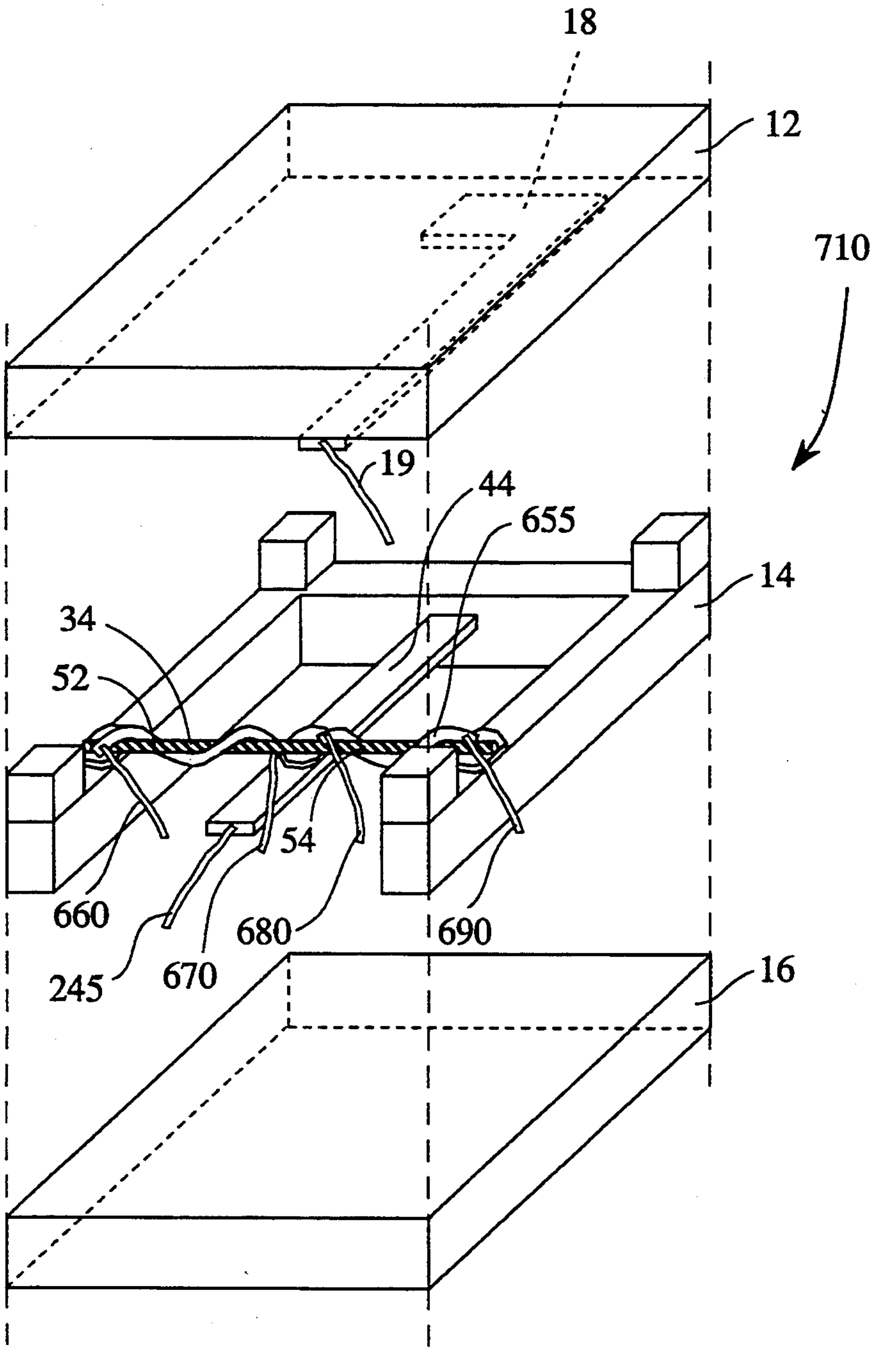
FIG. 9 is an exploded perspective view of a sixth embodiment of an on-off switch in accordance with the present invention.
Figure 10:
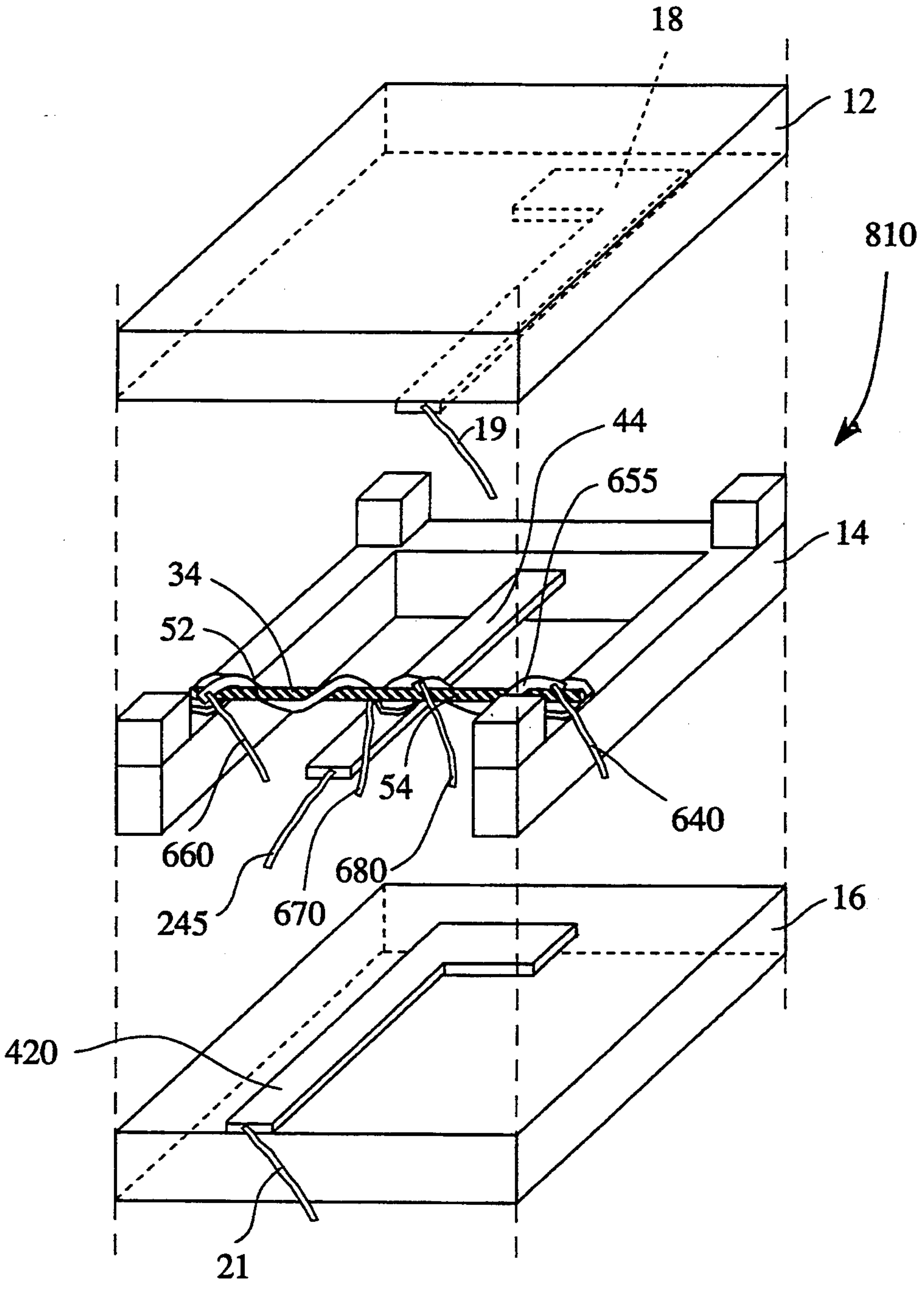
FIG. 10 is an exploded perspective view of a third embodiment of a two-way relay switch in accordance with the present invention.

FIGS. 8–10 illustrate different embodiments of the invention wherein the heating of the SMA wire 34 is accomplished by twisting a high-resistivity wire with the SMA wire. With reference to FIG. 8, an on-off switch 610 is shown that is similar to the switch 10 described with reference with FIG. 1. The switch 610, however, is provided with a high-resistivity wire 655 made of a suitable, high resistivity material. The wire 655 is twisted with the SMA wire 34 with its ends welded to the arms 30 and 32 of the middle plate. The wire 655 is preferably provided with four electrical connections 660, 670, 680, and 690 that are selectively supplied with electrical current in order to selectively heat the sections 52 and 54 of the SMA wire 34. Electrical current may be applied to the electrical connections 660 and 670 in order to heat the one side 52 of the SMA wire, and electrical current may be applied to the other two electrical connections 680 and 690 in order to heat the other side 54 of the SMA wire.

FIG. 9 illustrates another on-off switch 710 that is similar to the switch 210 of FIG. 4 but which is also provided with a high-resistivity wire 655 like that provided with switch 610 of FIG. 8. Electrical current may be selectively applied to the electrical connections 660, 670, 680, and 690 in order to move the tongue 44 into and out of engagement with the contact 18.

FIG. 10 illustrates another relay switch 810 that is similar to the relay switch 410 of FIG. 6 but which is also provided with a high-resistivity wire 655 like that provided with switch 610 of FIG. 8. Electrical current may be selectively applied to the electrical connections 660, 670, 680, and 690 in order to move the tongue 44 into and out of engagement with the contacts 18 and 420.

Although the present invention has been described with reference to preferred embodiments, the invention is not limited to details thereof. Various substitutions and modifications will occur to those of ordinary skill in the art, and all such substitutions and modifications are intended to fall within the scope of the invention as defined in the appended claims.

What is claimed is:

1. An electrical switch comprising:

a plate member;

at least one electrical contact mounted to said plate member;

a support mounted to said plate member, said support including two opposing support members;

an elongate member comprising a shape memory alloy and having two ends, each one of said ends of said elongate member being attached to respective ones of said support members, said elongate member extending along a substantially straight path from one of said ends to the other of said ends;

a switch element made of an electrically-conductive material, said switch element being attached to said elongate member at a location intermediate the two ends of the elongate member; and heating means for selectively heating the elongate member such that said elongate member moves causing said switch element to move into or out of contact with said at least one electrical contact.

2. The electrical switch of claim 1, wherein said elongate member is a wire.

3. The electrical switch of claim 1, wherein said elongate member is twisted about an axis, and said heating means is operable to heat at least a portion of said elongate member such that said portion of said elongate member tends to untwist thereby causing the switch element to move.

4. The electrical switch of claim 3, wherein said elongate member is twisted about an axis passing through said elongate member.

5. The electrical switch of claim 1, wherein said elongate member is twisted about an axis, and said heating means is operable to heat at least a portion of said elongate member such that said portion of said elongate member tends to untwist thereby causing the switch element to move.

6. The electrical switch of claim 1, wherein said heating means comprises at least one optical member positioned proximate said elongate member.

7. An electrical switch comprising:

at least one electrical contact:

a support:

an elongate member comprising a shape memory alloy and having two ends, said elongate member being attached at either end to said support;

a switch element made of an electrically-conductive material, said switch element being attached to said elongate member at a location intermediate the two ends of the elongate member; and heating means for selectively heating the elongate member such that said elongate member moves causing said switch element to move into or out of contact with said at least one electrical contact;

wherein said heating means includes at least two optical members, a first of which is positioned proximate a first portion of said elongate member and is operable to heat said first portion and the second of which is positioned proximate a second portion of said elongate member and is operable to heat said second portion of said elongate member.

8. The electrical switch of claim 7, wherein said elongate member is twisted about a longitudinal axis thereof; and wherein said first portion of said elongated member tends to untwist when said first optical member is operated, and said second portion of said elongated member tends to untwist when said second optical member is operated.

9. The electrical switch of claim 6, wherein said at least one optical member is a light-emitting diode.

10. The electrical switch of claim 1, wherein said heating means comprises a plurality of electrical connections provided along said elongate member to which electrical current may be selectively applied.

11. The electrical switch of claim 10, wherein said plurality of electrical connections includes three electrical connections, the first electrical connection being positioned proximate one end of said elongate member, the second electrical connection being positioned proximate the other end of said elongate member, and the third electrical connection being positioned proximate the point where said switch member is attached to said elongate member.

12. The electrical switch of claim 11, wherein said elongated member is twisted about a longitudinal axis thereof; and whereby electrical current applied to the first and third electrical connections causes a first portion of said elongate member lying between said first and third electrical connections to tend to untwist, and whereby electrical current applied to the second and third electrical connections causes a second portion of said elongate member lying between said second and third electrical connections to tend to untwist.

13. The electrical switch of claim 1, wherein said heating means comprises at least one high-resistivity wire that is positioned proximate said elongate member and provided with at least one electrical connection to which electrical current may be selectively applied.

14. An electrical switch comprising:

at least one electrical contact;

a support;

an elongate member comprising a shape memory alloy and having two ends, said elongate member being attached at either end to said support;.

a switch element made of an electrically-conductive material, said switch element being attached to said elongate member at a location intermediate the two ends of the elongate member: and heating means for selectively heating the elongate member such that said elongate member moves causing said switch element to move into or out of contact with said at least one electrical contact:

wherein said heating means comprises at least one high-resistivity wire that is positioned proximate said elongate member and provided with at least one electrical connection to which electrical current may be selectively applied;

wherein said at least one electrical connection includes three electrical connections, the first electrical connection being positioned proximate one end of said elongate member, the second electrical connection being positioned proximate the other end of said elongate member, and the third electrical connection being positioned proximate the point where said switch member is attached to said elongate member.

15. The electrical switch of claim 14, wherein said elongate member is twisted about a longitudinal axis thereof, and said at least one high-resistivity wire is twisted about said elongate member; and whereby electrical current applied to the first and third electrical connections causes a first portion of said elongate member lying between said first and third electrical connections to tend to untwist, and whereby electrical current applied to the second and third electrical connections causes a second portion of said elongate member lying between said second and third electrical connections to tend to untwist.

16. An electrical switch comprising:

a support assembly, said support assembly having a first substantially flat portion, a second substantially flat portion positioned opposite said first flat portion, and two opposing side portions positioned between said first and second flat portions;

at least one electrical contact mounted to said support assembly;

an elongate member comprising a shape memory alloy and having two ends, each one of said ends of said elongate member being attached to respective ones of said two opposing side portions of said support assembly, said elongate member extending along a substantially straight path from one of said two ends to the other of said two ends;

a switch element made of an electrically-conducting material, said switch element being attached to said elongate member at a location intermediate the two ends of said elongate member; and at least one heater that can be selectively operated to heat said elongate member such that said elongate member moves causing said switch element to move into or out of contact with said electrical contact.

17. The electrical switch of claim 16, wherein said heater comprises at least one light source positioned proximate said elongate member.

18. The electrical switch of claim 17, wherein said light source comprises at least one light-emitting diode.

19. The electrical switch of claim 16, wherein said heater comprises at least one high-resistivity wire, positioned proximate said elongate member, to which electrical current may be selectively applied.

20. An electrical switch comprising:

at least one electrical contact;

a support assembly;

an elongate member comprising a shape memory alloy and having two ends, said elongate member being attached at either end to said support assembly;

a switch element made of an electrically-conducting material, said switch element being attached to said elongate member at a location intermediate the two ends of said elongate member; and at least one heater;

wherein said heater can be selectively operated to heat said elongate member such that said elongate member moves causing said switch element to move into or out of contact with said electrical contact, said heater comprising at least one high-resistivity wire, positioned proximate said elongate member, to which electrical current may be selectively applied; and wherein said at least one high-resistivity wire is twisted about said elongate member.

21. An electrical switch comprising:

a first support member;

a support assembly coupled to said first support member;

a first electrical contact mounted to said first support member;

an elongate member comprising a shape memory alloy and having two ends, said elongate member being attached at either end to said support assembly, being twisted about a longitudinal axis of said elongate member, and extending along a substantially straight path from one of said two ends to the other of said two ends;

a switch element made of an electrically-conducting material, said switch element being attached to said elongate member at a location intermediate the two ends of said elongate member;

a second support member coupled to said support assembly such that said support assembly is disposed between said first and said second support member; and heating means for selectively heating said elongate member such that said elongate member moves causing said switch element to move into or out of contact with said first electrical contact.

22. The electrical switch of claim 21, further comprising a second electrical contact mounted to said second support member such that at least a portion of said second electrical contact is substantially opposite at least a portion of said first electrical contact, wherein said heating means is operable to selectively heat said elongate member such that one end of said switch element may be brought into or out of contact with either said first or second contact.

23. An electrical switch comprising:

a first support member;

a support assembly disposed adjacent said first support member;

a first electrical contact mounted to said first support member;

an elongate member comprising a shape memory alloy and having two ends, said elongate member being attached at either end to said support assembly;

a switch element made of an electrically-conducting material, said switch element being attached to said elongate member at a location intermediate the two ends of said elongate member;

a second support member positioned adjacent said support assembly such that said support assembly is disposed between said first and said second support member;

a second electrical contact mounted to said second support member; and heating means for selectively heating said elongate member such that said elongate member moves causing said switch element to move into or out of contact with said first electrical contact;

wherein said first electrical contact is positioned on said first support member such that at least a portion of said first electrical contact is substantially opposite a first end of said switch element and said second electrical contact is positioned on said second support member such that at least a portion of said second electrical contact is substantially opposite a second end of said switch element, whereby said heating means is operable to selectively heat said elongate member such that the first end of said switch element may be brought into or out of contact with said first contact and said second end of said switch element may be brought into or out of contact with said second contact.

24. An electrical switch comprising:

a first support member;

a support assembly disposed adjacent said first support member;

a first electrical contact mounted to said first support member;

an elongate member comprising a shape memory alloy and having two ends, said elongate member being attached at either end to said support assembly;

a switch element made of an electrically-conducting material, said switch element being attached to said elongate member at a location intermediate the two ends of said elongate member;

a second support member positioned adjacent said support assembly such that said support assembly is disposed between said first and said second support member; and heating means for selectively heating said elongate member such that said elongate member moves causing said switch element to move into or out of contact with said first electrical contact;

wherein said heating means comprises a first heating source positioned in said first support member and a second heating source positioned in said second support member.

25. The electrical switch of claim 24, wherein said first and second heating sources comprise first and second light-emitting diodes, respectively.

26. An electrical switch comprising:

a first support member;

a second support member disposed adjacent said first support member;

a first electrical contact mounted to said first support member;

an elongate member comprising a shape memory alloy and having two ends, said elongate member being attached at either end to said second support member;

a switch element made of an electrically-conducting material, said switch element being attached to said elongate member at a location intermediate the two ends of said elongate member; and heating means for selectively heating said elongate member such that said elongate member moves causing said switch element to move into or out of contact with said first electrical contact;

wherein said second support member has a substantially "U" shape with two opposing legs, and wherein one end of said elongate member is attached to one leg of said second support member and the other end of said elongate member is attached to the other leg of said second support member.

27. The electric switch of claim 1, wherein said support includes an intermediate member interconnecting said two opposing members.

28. The electric switch of claim 21, wherein said support assembly includes two opposing support members and each said ends of said elongate member are attached to respective ones of said opposing support members.

29. The electric switch of claim 28, wherein said support assembly includes an intermediate member interconnecting said two opposing members and at least one spacer member disposed between and interconnecting said support assembly and said first support member.

30. The electric switch of claim 24, further comprising a second electrical contact mounted to said second support member.

* * * * *